US007351385B1

(12) United States Patent
Batten et al.

(10) Patent No.: US 7,351,385 B1

(45) Date of Patent: Apr. 1, 2008

(54) SYSTEM FOR ENABLING LANDFILL DISPOSAL OF KITCHEN WASTE OIL/GREASE

(75) Inventors: William C. Batten, Asheboro, NC (US); Bruce W. Kyles, Asheboro, NC (US)

(73) Assignee: Clearline Systems, Inc., Asheboro, NC (US)

(*) Notice: Subject to any disclaimer, the term of this patent is extended or adjusted under 35 U.S.C. 154(b) by 781 days.

(21) Appl. No.: 10/738,385

(22) Filed: Dec. 17, 2003

(51) Int. Cl.

| | |
|---|---|
| ***B01J 19/00*** | (2006.01) |
| ***B01F 5/12*** | (2006.01) |
| ***B65D 88/54*** | (2006.01) |
| ***B65D 83/00*** | (2006.01) |
| ***G01F 11/00*** | (2006.01) |
| ***B01D 21/00*** | (2006.01) |

(52) U.S. Cl. ...................... 422/224; 366/265; 222/216; 222/251; 222/459; 210/702

(58) Field of Classification Search ................ 422/224; 366/265; 222/251, 459, 216; 210/610, 705
See application file for complete search history.

(56) References Cited

U.S. PATENT DOCUMENTS 2,876,082 A * 3/1959 Morrison .................... 422/106
3,487,439 A * 12/1969 Winston .................. 206/524.1
3,555,976 A * 1/1971 Carter et al. ................ 493/274
3,760,728 A * 9/1973 McKee et al. .............. 102/324
3,886,087 A * 5/1975 Terry .......................... 510/345
4,046,515 A 9/1977 de Leeuw .................... 23/259
4,153,374 A 5/1979 Adams ....................... 366/208
4,474,683 A * 10/1984 Story et al. ................. 510/445
4,504,261 A * 3/1985 Tanaka ....................... 493/273
4,555,345 A * 11/1985 Yoshida ...................... 210/705
4,578,246 A * 3/1986 Pope .......................... 422/111
4,737,263 A * 4/1988 Chen et al. ............ 208/120.01
4,772,434 A * 9/1988 Myers ........................... 264/8
4,830,214 A * 5/1989 Curliss et al. .............. 220/270
4,988,453 A * 1/1991 Chambers et al. .......... 510/147
5,028,142 A 7/1991 Ostoich et al. ............. 366/273
5,075,234 A * 12/1991 Tunac ..................... 435/301.1
5,098,564 A 3/1992 Miller et al. ................ 210/236
5,102,229 A * 4/1992 Wada et al. ................ 366/294
5,133,881 A 7/1992 Miller et al. ................ 210/776

(Continued)

FOREIGN PATENT DOCUMENTS

JP 7-233399 A * 9/1995

(Continued)

OTHER PUBLICATIONS

Article entitled "Lye to Fat Ratio Table" from Walton Feed, information from the interned; copyright 1997-2000.

(Continued)

*Primary Examiner*—Walter D. Griffin
*Assistant Examiner*—Huy-Tram Nguyen
(74) *Attorney, Agent, or Firm*—MacCord Mason PLLC

(57) ABSTRACT

An apparatus for conversion of kitchen waste grease to a landfill-acceptable solid includes a grease collection cartridge. A mixing baffle within the cartridge has a package with a reactant to convert grease and oil, and water into soap. The apparatus has means for delivering water, grease and oil to the cartridge for conversion to soap.

47 Claims, 10 Drawing Sheets

U.S. PATENT DOCUMENTS

| | | | | | |
|---|---|---|---|---|---|
| 5,178,754 | A | | 1/1993 | Batten et al. | 210/138 |
| 5,271,853 | A | | 12/1993 | Batten | 210/808 |
| 5,348,196 | A | * | 9/1994 | Smith et al. | 222/386 |
| 5,360,555 | A | | 11/1994 | Batten | 210/803 |
| 5,405,538 | A | | 4/1995 | Batten | 210/744 |
| 5,492,619 | A | | 2/1996 | Batten | 210/86 |
| 5,525,042 | A | | 6/1996 | Batten | 417/113 |
| 5,543,064 | A | | 8/1996 | Batten | 210/803 |
| 5,738,921 | A | * | 4/1998 | Andersen et al. | 428/36.4 |
| 5,806,710 | A | * | 9/1998 | Shiffer et al. | 220/785 |
| 5,908,377 | A | * | 6/1999 | Fukuda | 516/102 |
| 5,934,309 | A | | 8/1999 | Batten | 137/216 |
| 6,019,894 | A | | 2/2000 | Batten | 210/175 |
| 6,213,002 | B1 | | 4/2001 | Batten et al. | 99/340 |
| 6,238,572 | B1 | | 5/2001 | Batten | 210/739 |
| 6,261,462 | B1 | | 7/2001 | Batten | 210/739 |
| 6,328,901 | B1 | | 12/2001 | Batten | 137/216 |
| 6,368,501 | B1 | | 4/2002 | Batten | 310/181 |
| 6,413,435 | B1 | | 7/2002 | Kyles et al. | 210/800 |
| 6,435,078 | B1 | | 8/2002 | Batten et al. | 99/446 |
| 6,478,552 | B1 | | 11/2002 | Batten et al. | 417/393 |
| 6,491,830 | B1 | | 12/2002 | Batten et al. | 210/803 |
| 6,517,715 | B1 | | 2/2003 | Batten et al. | 210/232 |
| 6,576,140 | B1 | | 6/2003 | Batten | 210/744 |
| 6,582,205 | B2 | | 6/2003 | Batten et al. | 417/393 |
| 6,629,652 | B2 | | 10/2003 | Batten | 241/24.11 |
| 2002/0088723 | A1 | | 7/2002 | Lowry et al. | 206/204 |

FOREIGN PATENT DOCUMENTS

| | | | | |
|---|---|---|---|---|
| JP | 9-53099 | A | * | 2/1997 |

OTHER PUBLICATIONS

Article entitled “Making Soap with James Hershberger, A Chemical Engineer” from Walton Feed, information from the internet, copyright 2000.

* cited by examiner

SYSTEM FOR ENABLING LANDFILL DISPOSAL OF KITCHEN WASTE OIL/GREASE

BACKGROUND OF THE INVENTION

The invention relates to an apparatus for the conversion of kitchen waste grease and oil to a landfill acceptable solid material. A grease collection cartridge has an inlet for receiving kitchen waste grease, a mixing baffle within the cartridge and a package within the cartridge containing a reactant to solidify the grease and oil into soap.

Oil/grease and solid waste containment removal or recovery systems are well known in the prior art. Over the past 30 years there has been a steady move toward requiring facilities for servicing kitchen grease-bearing water flows. Sewer system lines can be clogged from the oil/grease materials put into the sewer systems from food handling facilities.

This has led more and more sewer authorities to require programs to control handling and storage of fats, oils and grease waste materials. These programs regulate food handling facilities and the manner in which they process oil/grease and solid waste material. The object of many of these programs is to ensure food handling facilities remove as much of the oil and grease as possible from the effluent flow, thereby releasing only grey water and solids into the sewer system.

There are many and very different kinds of oil/grease separators known in the art. Once the grease and oil have been removed from the effluent water, and the grey water has been directed to the sewer, storage and handling of the removed oil and grease is a costly and complicated process. The oil and grease removed from the effluent water must be stored in a separate system that cannot empty into the sewer system lines. Consequently, underground storage containment units have been utilized, as well as aboveground storage containment units. These storage units require servicing and periodic maintenance.

Servicing typically consists of having a maintenance contractor pump the oil/grease from the storage container and haul it to an approved facility. These storage systems may have sensors and elaborate computer generated signals to the maintenance facilities in order to ensure the grease and oil are removed before the storage unit overflows. In the absence of sensors that automatically sense when the storage unit needs servicing, humans must check the storage container periodically. The job of checking the grease level in the storage container may be a distasteful job, and in some cases the task may be ignored. The appropriate storage and removal to an acceptable waste receiving facility is as important in the process as the initial separation of the oil and grease from the effluent water of commercial kitchen sinks.

Landfills limit the kinds of waste material that can be stored in landfills and have stringent rules defining acceptable storage items. Oils that are liquid at room temperature and the residual water content of the commercial kitchen sink waste make the removed products quite liquid. As a result, grease and oil waste products removed from commercial kitchen effluent flows are typically not permitted to be disposed of in landfills because they remain so liquid as to fail what is known as the "paint filter" test.

Consequently, there is a need in the art for the conversion of the oil/grease waste material into a substance that does not require special handling or storage in a special removal facility, but rather that can be placed within sanitary landfills just like other ordinary garbage.

SUMMARY OF THE INVENTION

The present invention fulfills one or more of these needs by providing an apparatus that converts the oil/grease waste from commercial kitchens into a landfill acceptable solid, does not require costly storage systems and is easy to maintain.

An apparatus for conversion of kitchen waste grease to a landfill acceptable solid includes a grease collection cartridge having an inlet for receiving kitchen waste grease, a mixing baffle within the cartridge and a package within the cartridge containing a reactant to solidify the oil/grease waste. The collection cartridge may include a plastic lid with a handle and a bearing surface. A motor rotates the mixing baffle within the collection cartridge by engaging the driveshaft of the mixing baffle. The baffle acts as a paddle to mix the contents of the cartridge. The plastic lid further includes a safety micro switch actuator that prevents operation of the motor when the collection cartridge is not in place.

The collection cartridge typically has a cylindrical, plastic composite body with a plastic base. The plastic base may have a key on the exterior of the base. The key prevents rotation of the collection cartridge when it is in place in a notch within a cartridge holder assembly. The mixing baffle may be made of plastic and include a main shaft that has a "z" shaped cross section. The plastic base of the collection cartridge has a plastic bearing for the "z" shaped main shaft. The "z" shaped main shaft includes an interlock to a slot of the gear drive of the motor driving the mixing baffle. The mixing baffle may have openings and louvers located at the lower edges of the openings. The mixing baffle typically extends to two sides of the main shaft, and the louvers face opposite each other on the main shaft. The mixing baffle may include an attachment arm that is made of plastic and attached to the "z" shaped main shaft of the mixing baffle.

The attachment arm includes an attachment means to attach a package containing a reactant on the arm. The package is made of water-soluble material and contains a sufficient amount of a reactant (such as sodium hydroxide (lye)) selected to react with the grease in the cartridge to form a solid, like soap.

Once the grease placed in the cartridge is turned into a solid, the cartridge and its contents are disposable. In one embodiment, the cartridge has a sidewall that is made of spiral wound paper tube, and the tube has a water impervious plastic lining.

The invention also provides a cartridge holder assembly, which may be constructed of rotomolded plastic. The cartridge holder assembly is hollow and may also serve as a grease storage tank, to store liquids prior to transfer to the grease collection cartridge. The cartridge holder assembly may include an inlet valve that is connected to an oil/grease separation unit. When the inlet valve is opened, grease may be transferred from the oil/grease separator unit into the cartridge holder assembly. The cartridge holder assembly further typically includes a cartridge locating keyway notch. This cartridge-locating notch may be in the bottom of the cartridge holder assembly and prevents rotation of the grease collection cartridge when the key of the cartridge is placed within the cartridge holder assembly's notch.

The cartridge holder assembly typically includes a motor and a pump driven by that motor. The pump/motor draws water and grease from the cartridge holder assembly into the grease collection cartridge. The motor also rotates the mixing baffle in the grease collection cartridge. The rotation of the mixing baffle mixes water and reactant within the grease collection cartridge to form a liquid reactant that reacts with grease to form a solid such as soap. In one embodiment, the pump/motor is pivotally mounted to the top of the cartridge holder assembly so the motor drive shaft can be rotated down into position engaging the shaft of the baffle.

The cartridge holder assembly typically includes a water inlet to allow water into the cartridge holder assembly. The water inlet may include a solenoid valve that controls the flow of water into the cartridge holder assembly. The cartridge holder assembly may also have a heater, to provide sufficient heat to keep the grease in flowable form. The heater may be an immersion type heater or an external, wrap-style heater.

The cartridge holder assembly may include sensors. The sensors include a "grease full" sensor which signals when the cartridge holder assembly contains a quantity of grease appropriate to be transferred into the grease collection cartridge. The cartridge holder assembly may include a "water full" sensor that signals when the cartridge holder assembly contains a desired amount of water. The cartridge holder assembly has an air vent near its top.

The cartridge holder assembly may include an oil and grease inlet that is connected to an oil/grease separator. The oil/grease separator receives effluent water from a commercial kitchen sink or other grease source. The oil/grease separator separates oil and grease from the effluent water. The separated oil and grease are then transferred from the oil/grease separator through the oil and grease inlet into the cartridge holder assembly for storage until there is a sufficient amount of oil and grease to be transferred into the grease collection cartridge to be processed.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
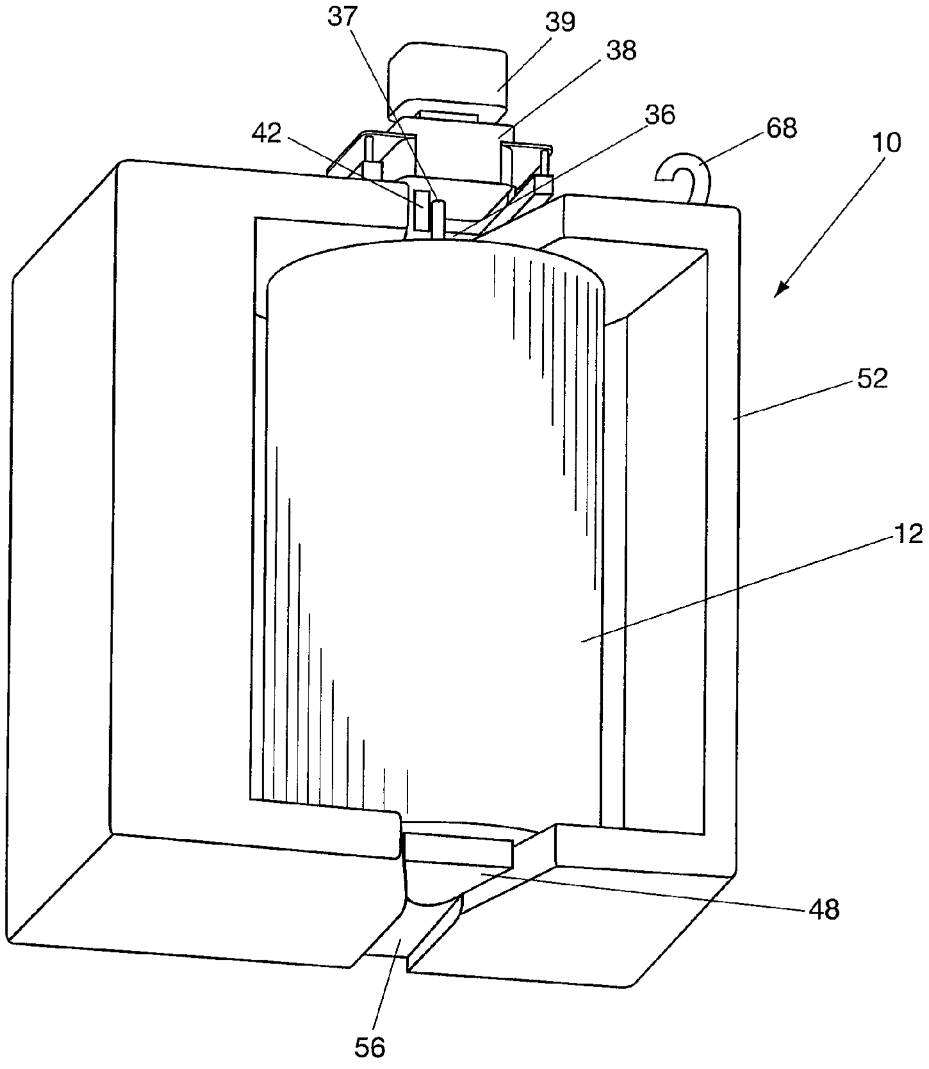
FIG. 1 is a perspective view of the preferred embodiment of the cartridge loaded in a cartridge holder assembly.

In the following description, like reference characters designate like or corresponding parts throughout the several figures. It should be understood that the illustrations are for the purpose of describing preferred embodiments of the invention and are not intended to limit the invention thereto.

As best seen in FIG. 1, one embodiment of the apparatus 10 for conversion of kitchen waste grease to a landfill acceptable solid includes a grease collection cartridge or housing 12, that has a mixing baffle and a package containing a reactant to solidify grease and oil. The cartridge is loaded in a cartridge holder assembly 52.

As seen in FIGS. 1, 3, 3A, 3B and 4, the grease collection cartridge 12 has a cylindrical composite plastic body 44. The grease collection cartridge 12 may have a sidewall that is constructed of spiral wound paper tubing. This tubing includes a water impervious plastic inner lining. Other construction materials may be substituted. The grease collection cartridge 12 also includes a plastic base 46. The plastic base 46 includes a key 48 on the bottom of the base 46. The key 48 is made of plastic and may be integrally molded with the base. The key prevents rotation of the grease collection cartridge 12 when it is placed within the cartridge holder assembly 52, and the motor 39 is actuated. The unused cartridge has a paper or plastic liner that covers the inside of an opening in bearing surface 36 (see FIG. 4) and is punctured when the cartridge is in place in the assembly 52 with the motor lowered. For additional safety, a removable outer cap (not shown) can cover the surface 36 and be replaced when the cartridge is ready for disposal.

Figure 2:
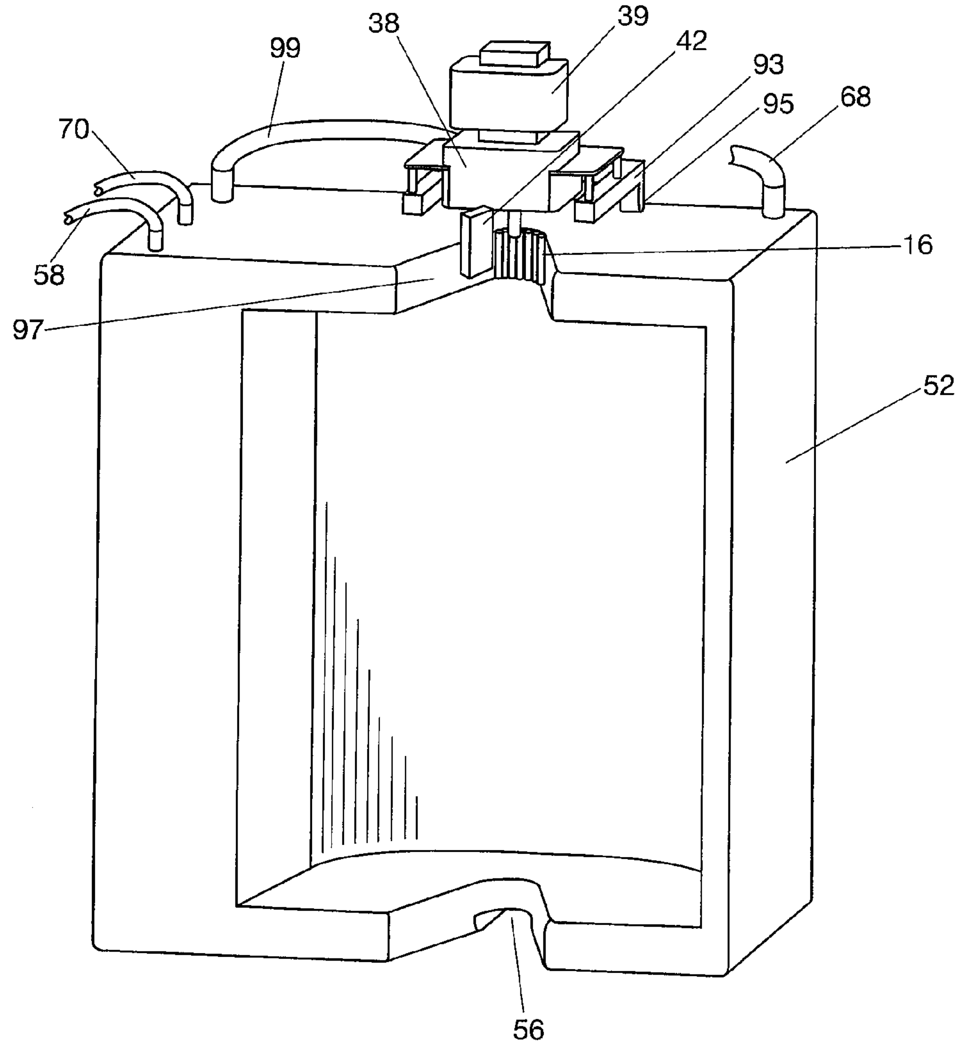
FIG. 2 is a perspective view of the cartridge holder assembly of FIG. 1.
Figure 3:
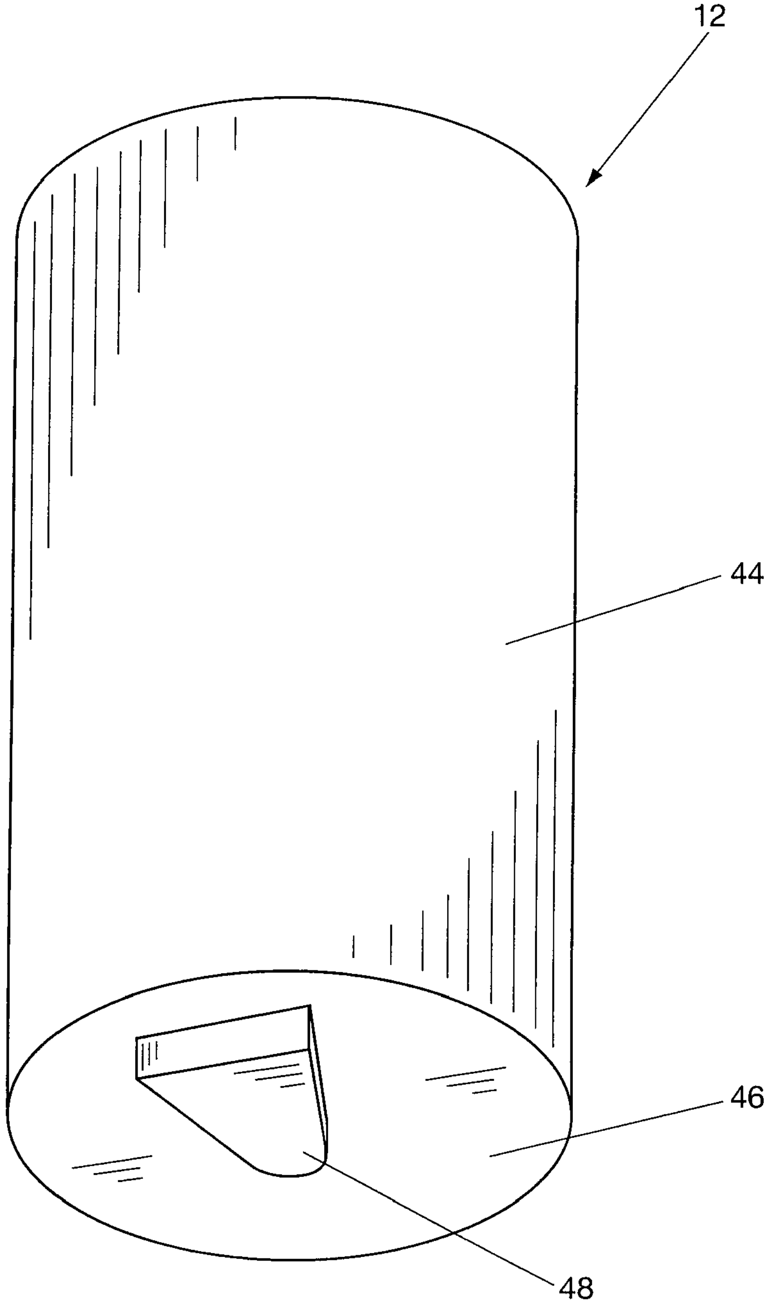
FIG. 3 is a bottom perspective view of the grease collection cartridge of FIG. 1.
Figure 3A:
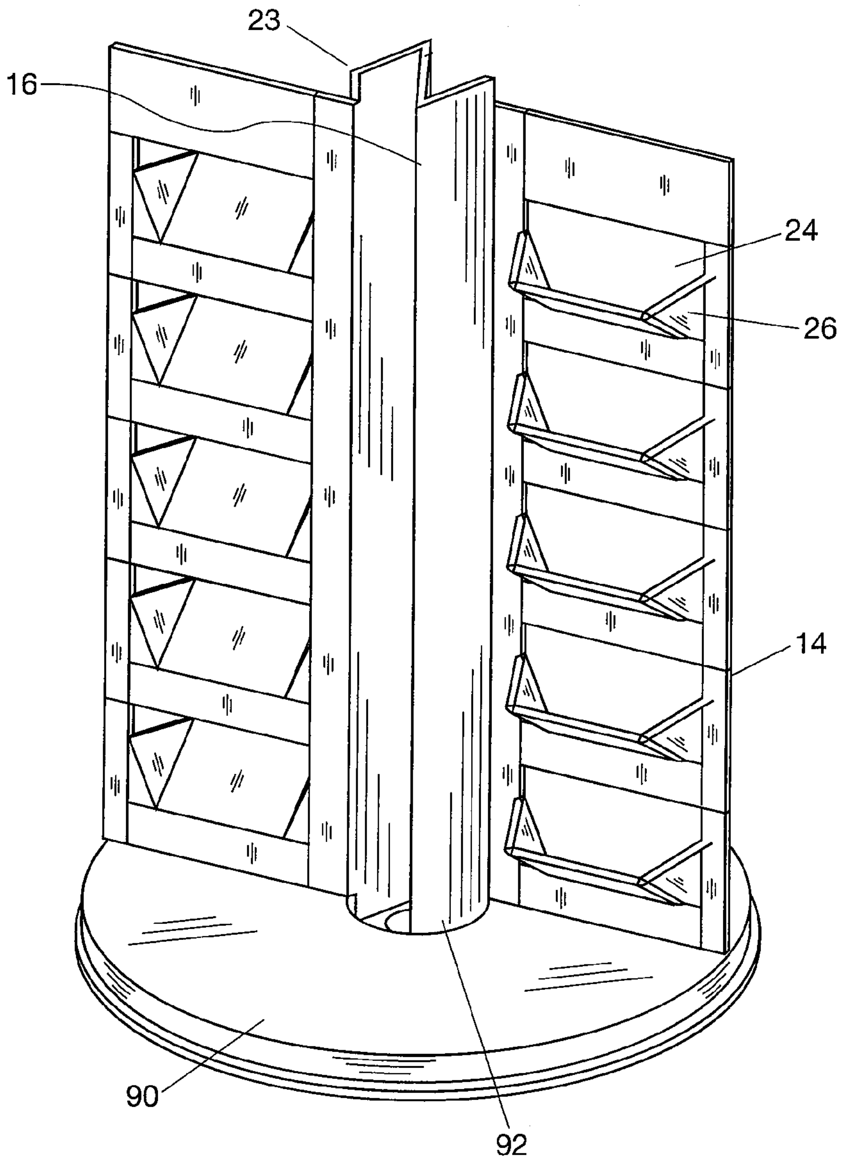
FIG. 3A is a perspective view of the mixing baffle of the cartridge of FIG. 1.
Figure 3B:
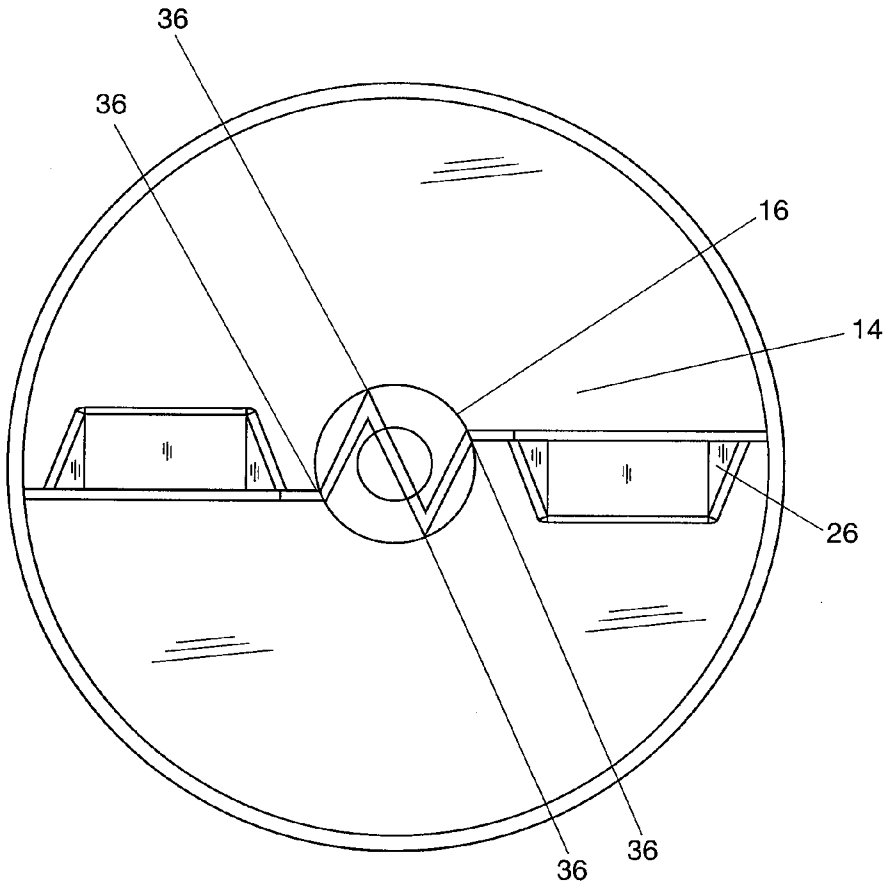
FIG. 3B is a top view of the mixing baffle of the cartridge of FIG. 1.
Figure 4:
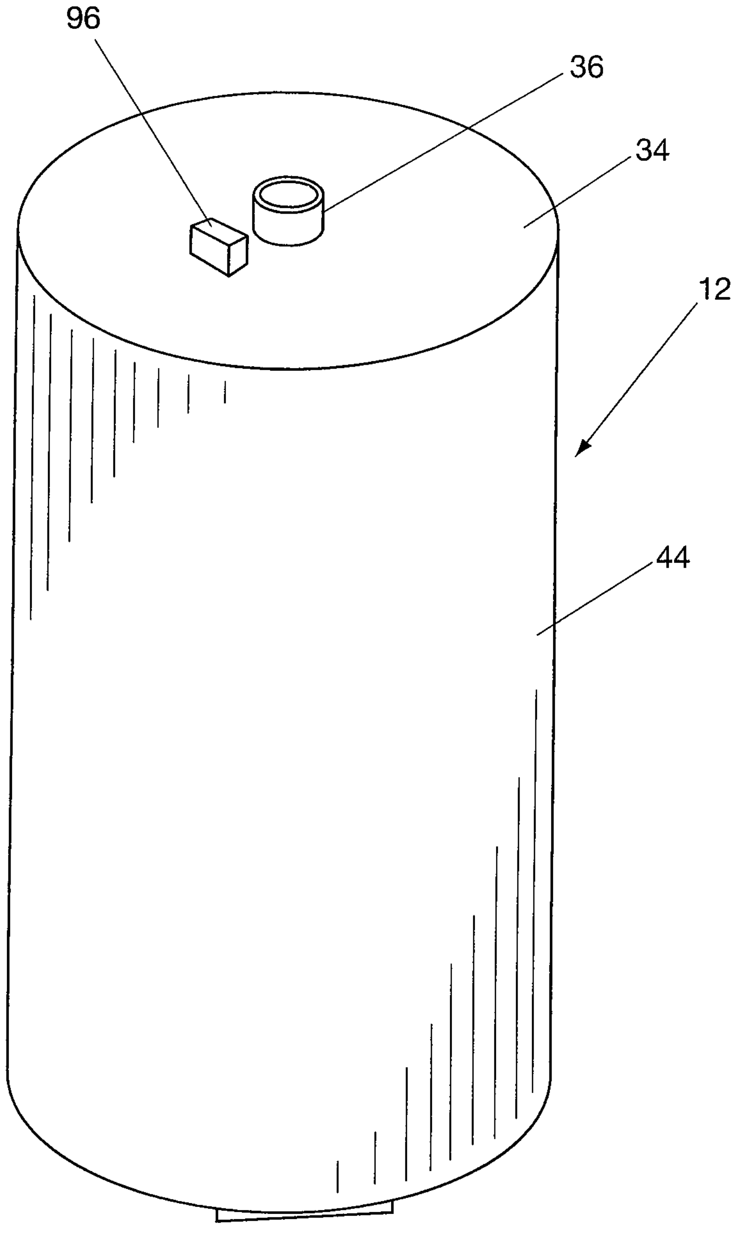
FIG. 4 is a top perspective view of the grease collection cartridge of FIG. 1.
Figure 5:
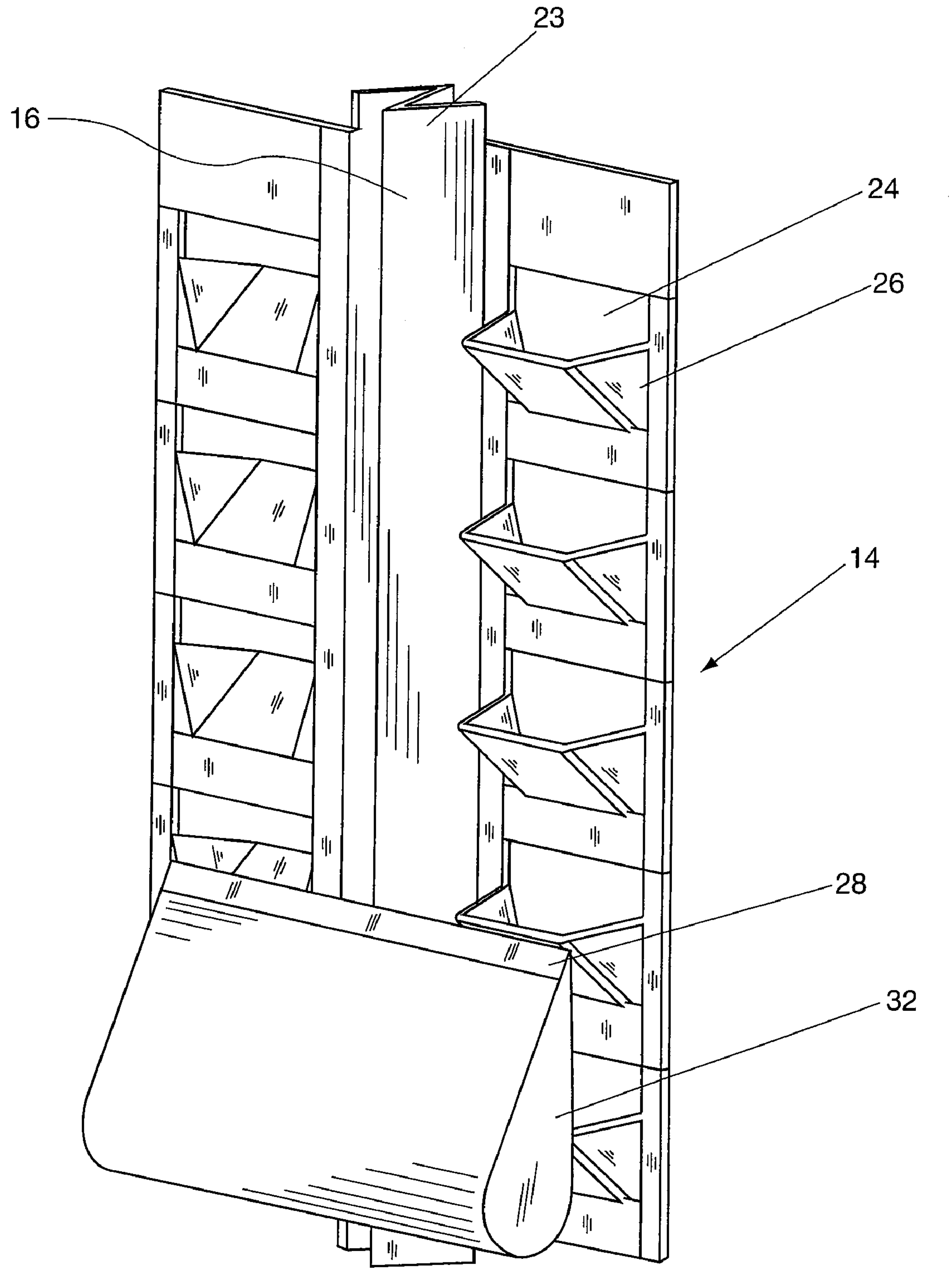
FIG. 5 is a perspective view of the mixing baffle with the reactive package attached of the cartridge of FIG. 1.

FIGS. 3A and 5 show the mixing baffle 14 within the cartridge, and it is preferably made of plastic. The baffle can be an inexpensive thermoformed or other plastic molded item. The baffle can also be considered a paddle to agitate or mix contents of the cartridge. The mixing baffle 14 includes a main shaft 16 that has a "z" shaped cross-section. The top of the grease collection cartridge 12 has a plunger 96 and a bearing 36 seen in FIG. 4, which receives the top 23 of the "z" shaped shaft 16, so the shaft 16 is journaled in the bearing. The top 23 of the "z" shaped baffle interlocks into a slot (not shown) of the drive shaft of the motor 39 on the assembly 52. The interlocked shafts rotate the mixing baffle 14 when the motor 39 is actuated. The mixing baffle 14 has openings 24, with louvers 26 at the lower edges of the baffle openings 24. The mixing baffle 14 extends to two sides of the baffle shaft 16 and the louvers 26 face opposite sides of the baffle shaft 16. The bearing surface 36 engages with a shaft 16 of the motor 39 as seen in FIGS. 1, 2, 3A and 3B. The top 23 of the "z" shaped baffle shaft 16 extends two inches above the mixing baffle 14 blades. The four corners of the extension of the "z" shaped baffle shaft 16 form the points of contact surfaces 36 within the bearing. The "z" shaped shaft thus has four points of contact within the bearing, providing stability with minimal friction, at low cost. The bottom of the baffle is journaled in a similar bearing 92 in the bottom plate 90, as seen in FIG. 3A.

FIG. 5 shows that the mixing baffle 14 has an attachment arm 28. This attachment arm is made of plastic and is affixed to the "z" shaped baffle shaft 16 of the mixing baffle 14. The attachment arm 28 includes an attachment means (such as staple or adhesive or other suitable arrangement) to attach a reactant package 32 to the shaft 16 of the mixing baffle 14. The reactant package 32 is made of a water-soluble material such as polyvinyl alcohol and contains a sufficient amount of a reactant such as solid sodium hydroxide (lye) to turn the grease to be placed into the grease collection cartridge 12 into soap. (As used herein, the term "soap" means the oil/grease made into a solid by reaction with a strong alkali. The presence of contaminants from the kitchen waste may make the product not what one would normally use as soap. Nonetheless, for the purposes of this disclosure, such a solid is deemed to be "soap.") The amount of reactant is preferably enough to completely solidify the grease/oil to be put in the housing 12 without having excess reactant. If sodium hydroxide is the reactant, it is preferably present in an amount of about 13.2% to about 18.4% weight to weight of fat. Preferably the cartridge receives water at about 38 weight percentage of fat. Dipropylene glycol in an amount of 0.05 to 0.25 weight percent of fat may also be included in the package 32 to accelerate the soap formation by reducing surface tension. Other suitable reactants that solidify oil/grease may be used. By encapsulating the reactant in the package, possible accidental leakage of caustic reactant is minimized. Once the oil/grease that is placed within the grease collection cartridge 12 is turned into soap, the grease collection cartridge 12 and its contents are disposable in a landfill.

FIGS. 1 and 2 show a preferred embodiment of the cartridge holder assembly 52. The cartridge holder assembly 52 may be constructed of rotomolded plastic and is a hollow assembly. The cartridge holder assembly 52 also serves as a grease storage tank. In other embodiments, the tank is separate. The hollow storage tank holds oil/grease and water for transfer to the grease collection cartridge 12. Oil/grease inlet 70 provides a fitting to receive oil/grease from a separator, such as a Big Dipper® separator sold by Thermaco, Inc. of Asheboro, N.C. A water inlet 58 provides a way for water to be introduced which will be used to dissolve the sodium hydroxide or other reactant. Other holding tank arrangements may be substituted.

A motor assembly includes a frame 93 pivotally mounted at 95 to the top of the assembly 52. As seen in FIG. 2, this enables the motor 39 and its drive shaft 37 to be raised or lowered above a notch 97 in the assembly 52. The notch provides a place for the bearing surface 36 of the cartridge to be located, so when the shaft 37 is lowered, it punctures the paper seal over the bearing and engages the shaft 16 of the baffle.

Adjacent the shaft 37 is the termination of the transfer tube 99 that delivers water, then oil/grease from the assembly 52 to the cartridge, entering through the opening bounded by the bearing surface 36. The frame 93 includes a safety micro switch 42 that prevents operation of the motor 39 when a grease collection cartridge 12 is not in place within the cartridge holder assembly. The safety micro switch 42 closes the electrical circuit when the plunger 96 of the lid engages it. When a cartridge 12 is put in place within the cartridge holder assembly 52 and the frame 93 is lowered, the switch 42 is pushed closed, engaging the electrical circuit of the motor 39 to the closed position to permit the motor to operate. The cartridge holder assembly 52 also includes a cartridge locating keyway notch 56. The cartridge-locating notch 56 is located in the bottom of the cartridge holder assembly 52 and prevents rotation of the grease collection cartridge 12 by engaging the key 48 when the cartridge is placed within the cartridge holder assembly 52 and the motor is actuated.

The frame 93 includes a pump 38 driven by the motor 39. A suction line 65 extends from a lower portion of the tank 52 to the pump 38. Due to the stratification of grease above the water in the tank 52 and the low position of the intake to the line 65, the pump initially pumps water from the tank into the grease collection cartridge 12, followed by grease. The water dissolves the package 32, releasing the reactant, which dissolves in the water under the agitation of the rotating baffle. When the grease is delivered to the cartridge 12, it is mixed with the reactant by the rotating baffle. As the pumping proceeds, the motor 39 rotates the mixing baffle 14 in the grease collection cartridge 12. The rotation of the mixing baffle 14 mixes grease, water and sodium hydroxide (lye) within the grease collection cartridge 12. The sodium hydroxide becomes a liquid reactant that combines chemically with the grease and oil to turn the mixture into soap. The dissolution of sodium hydroxide is strongly exothermic, so once the process starts, the continued pumping of water and grease and their mixing preferably proceeds promptly to prevent excess temperatures by providing a large heat sink of water, grease and then soap.

Figure 6:
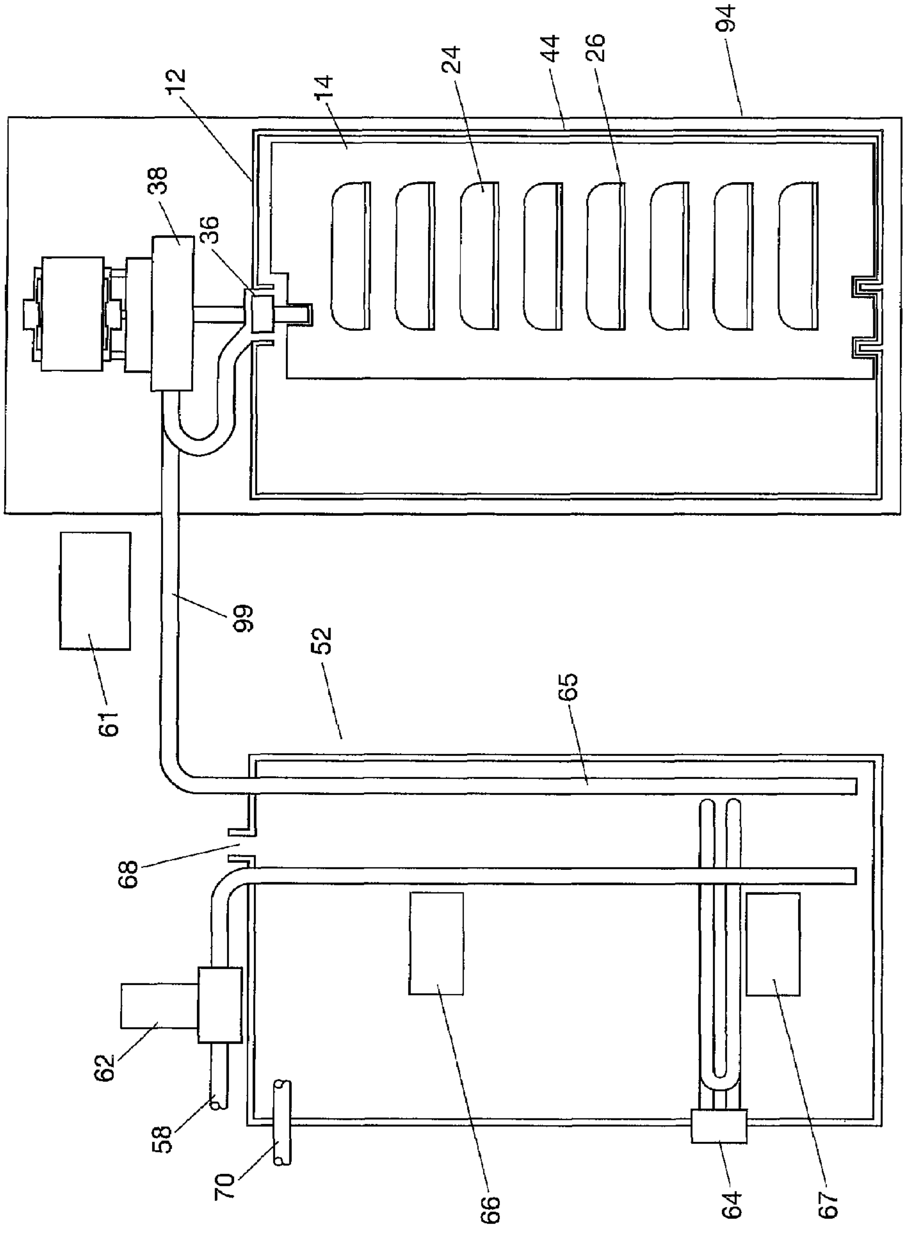
FIG. 6 is a cross-sectional schematic representation of the grease collection cartridge connected to the cartridge holder assembly.
Figure 7:
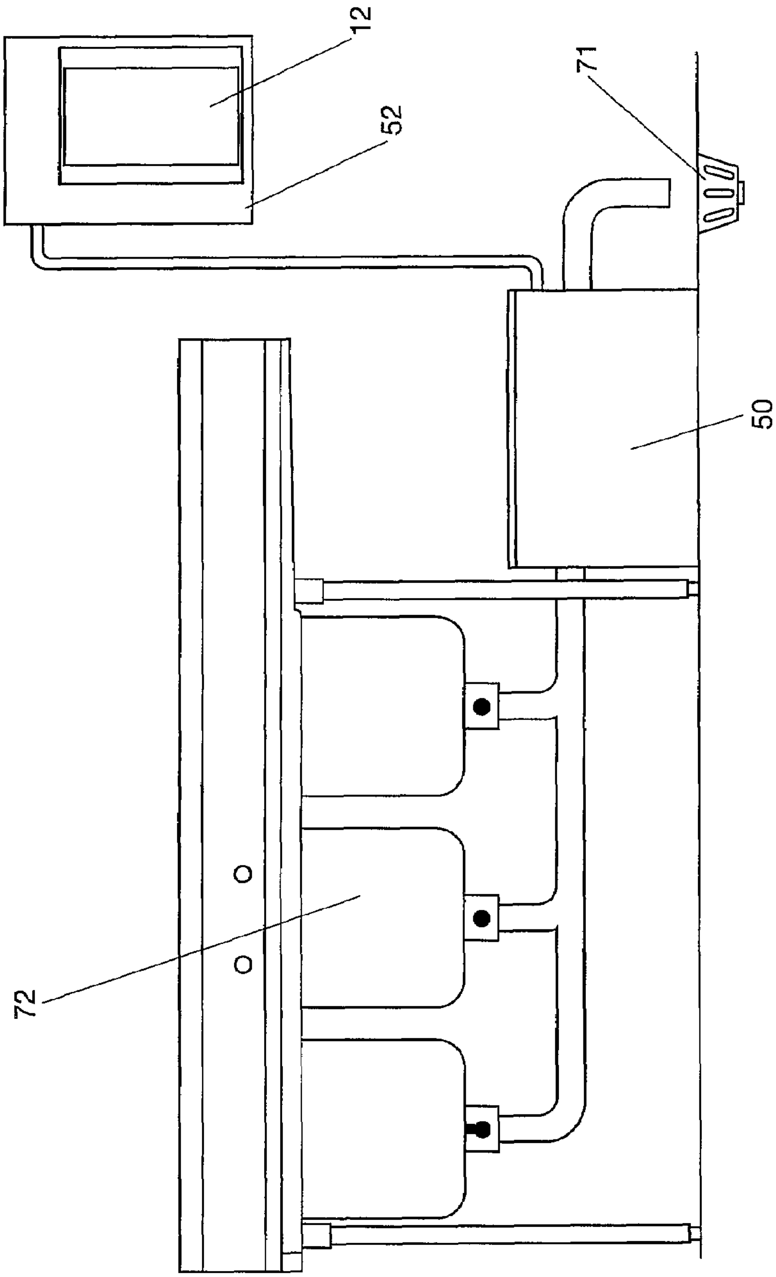
FIG. 7 is a schematic representation of a typical installation of the preferred embodiment of the invention with an oil/grease separator and a commercial kitchen sink.

FIGS. 6 and 7 show the tank 52 as a separate housing. Indeed, this is an alternate configuration to the embodiment of FIG. 1. The cartridge then has a cartridge support 94. An inlet 70 is connected to the tank 52. The inlet 70 receives oil, grease and a little water from an oil/grease separator unit 50 (see FIG. 7). When the inlet 70 is open, grease may be transferred from the oil/grease separator unit 50 into the tank 52. A valve may be used to open and close the inlet, such as a solenoid controlled valve.

As seen in FIG. 6, the tank includes a water inlet 58 to allow water into the cartridge holder assembly 52. The water inlet 58 is equipped with a solenoid valve 62 that controls the flow of water into the cartridge holder assembly 52. The tank 52 further includes a heater 64 to provide sufficient heat to keep the grease in liquid form. The heater 64 may be an immersion type heater or an external wrap-type heater. Similar features are included in the embodiment of FIG. 1.

The tank 52 includes sensors to indicate when certain conditions are met. A "grease full" sensor 66 signals when the cartridge holder assembly 52 contains a quantity of grease appropriate to be transferred into the grease collection cartridge 12. A "water full" sensor 67 signals when the cartridge holder assembly 52 contains the desired quantity of water. These signals are sent to a control system 61 such as a programmable logic controller which controls the engagement of the electrical components as discussed below. The control system may also be provided by a series of relays or "and gates." Similar features are included in the embodiment of FIG. 1.

The various structures disclosed herein for receiving the cartridge are generally "receivers."

Referring to FIGS. 1 and 6, the cartridge holder assembly and tank 52 include an air vent 68 located on their respective tops. The air vent 68 allows air to flow in or out as the liquid levels fluctuate. The inlet to the lid 34 of the grease collection cartridge 12 is not sealed once the transfer tube 99 has been inserted, so some air can escape the cartridge from the area around the bearing surface 36.

FIG. 7 shows the oil/grease separator 50 connected to a commercial kitchen sink 72 to receive effluent wastewater from the sink 72. The oil/grease separator 50 separates oil and grease from the effluent wastewater and directs the resulting grey water to a sewer line 71 or other discharge. The oil/grease separated from the effluent wastewater is transferred from the oil/grease separator 50 by the oil/grease inlet 70 into the tank or cartridge holder assembly 52 to be processed into soap. When the tank or cartridge holder assembly 52 contains a sufficient amount of grease, as indicated by the "grease full" sensor 66, the solenoid valve 62 is opened to introduce enough water to reach the "water full" sensor. When a sufficient amount of water is in the tank, as indicated by the "water full" sensor 67, and a cartridge is in place, as indicated by the closure of switch 42, water and grease are transferred into the grease collection cartridge 12 by the pump 38 driven by the motor 39.

The motor 39 is activated to pump the water and grease into the grease collection cartridge 12, and simultaneously the motor 39 rotates the mixing baffle 14. The water dissolves the reactant package 32, permitting the sodium hydroxide (lye) to mix with the water and then the grease. The mixing baffle 14 is rotated for a sufficient amount of time until the mixture of water, oil and sodium hydroxide (lye) turn into soap. As the soap solid forms, the viscosity of the mixture increases, ultimately to the point that the baffle meets so much resistance that it no longer turns. The drive shaft of the motor will then rise above the shaft of the baffle, causing the switch 42 to open, and deactivating the motor. Alternatively, the motor may be provided with a slip clutch and/or a timer or a current sensor that senses a rise in the current to the motor caused by the physical resistance, and cuts off the power supply. The grease collection cartridge 12 containing the soap can then be removed from the assembly and thrown into a container to be transported to a landfill for disposal.

Figure 8:
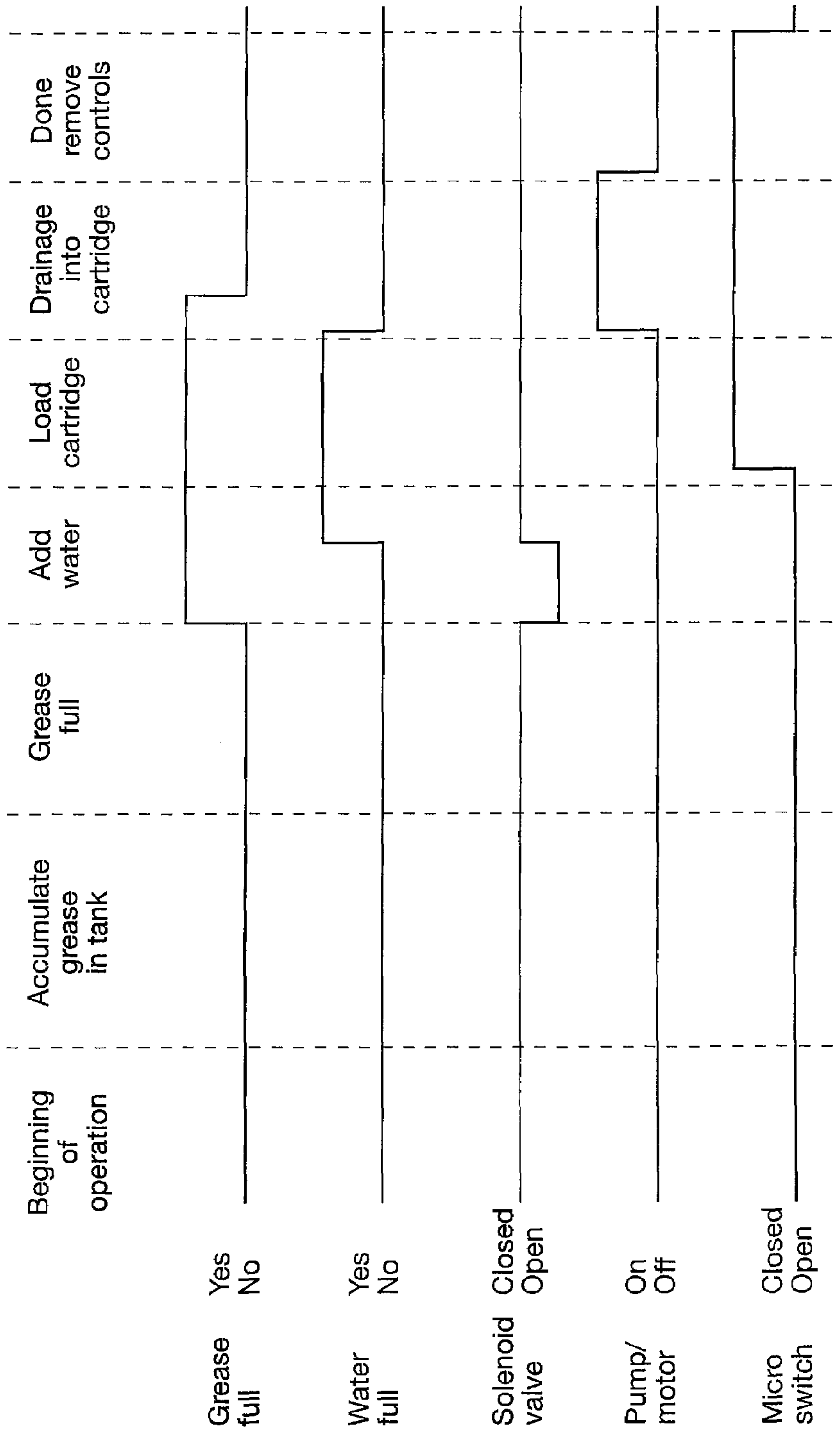
FIG. 8 is a logic state diagram for the operation of a control system for the cartridge holder assembly.

FIG. 8 shows a logic state diagram reflecting data inputs (grease full sensor 66, water full sensor 67, and microswitch 42,) and the controlled elements (solenoid valve 62 and motor 39) to the control system 61. The actuation of the micro switch by an operator's placement or removal of a cartridge is, of course, variable and may not be as shown in this diagram. However, the microswitch must be closed to permit operation of the pump/motor, albeit with a possible programmed delay. If the other inputs indicate that it is time for a transfer of oil/grease to a cartridge, the control system may have a means such as an audible or visible signal to load an empty cartridge.

Certain modifications and improvements will occur to those skilled in the art upon reading the foregoing description. For example, the cartridge and its baffle can be made of any suitable material that is water impermeable and low enough in cost so as to be disposable. The baffle can take various shapes and be made of various materials. In fact, if desired, the baffle and its associated drive motor can be dispensed with if another mixing arrangement is substituted, such as a shaker for the cartridge. In another embodiment, the grease may be directed into a flaccid bag that is kneaded to mix the grease and reactant. Other agitation means can be a bubbler to introduce air into a lower portion of the cartridge to rise as bubbles through the liquids. Another option is the use of ultrasonics. The liquids may be introduced other than through the top of the cartridge.

In some cases it may be preferably to mechanically emulsify the oil/grease and water before pumping than into the reactant-containing cartridge. The options for mixing the fluids as disclosed herein are means to agitate.

As noted, the tank that discharges the oil/grease into the cartridge can be part of the housing for the cartridge, or separate. The pump may be eliminated if other means to deliver oil/grease and water are substituted, such as gravity feed or a suitably arranged siphon. Also, the oil/grease and water supplies into the tank may take various forms, including the delivery of some water with the oil/grease, eliminating the need for a separate water supply. The heater may be run continually, under timer control, or be turned on in response to a sensed grease presence. A delay circuit may be included to start the pump/motor a few seconds or minutes after the cartridge is in place and the tank 52 is appropriately full of grease and water.

It should be understood that such modifications and improvements have been omitted for the sake of conciseness and readability, but are properly within the scope of the following claims.

What is claimed is:

1. A grease collection cartridge for holding kitchen waste grease as a landfill-acceptable solid comprising:

housing for containing the kitchen waste grease and having an inlet for receiving kitchen waste grease, wherein the housing has an outer wall layer of spiral wound paper tubing;

a mixing baffle within the housing; and a reactant within the cartridge to solidify grease and oil.

2. The apparatus according to claim 1, wherein the housing has a lid with a plunger adapted to actuate a switch.

3. The apparatus according to claim 1, wherein the housing has a lid with a bearing surface in which a shaft of the mixing baffle is journaled.

4. The apparatus according to claim 1, wherein the housing has a cylindrical composite plastic body.

5. The apparatus according to claim 1, wherein the housing includes a plastic base.

6. The apparatus according to claim 5, wherein the plastic base includes a key on the exterior of the plastic base.

7. The apparatus according to claim 6, wherein the key is made of plastic.

8. The apparatus according to claim 1, wherein the mixing baffle is made of plastic.

9. A grease collection cartridge for holding kitchen waste grease as a landfill-acceptable solid comprising:

housing for containing the kitchen waste grease and having an inlet for receiving kitchen waste grease;

a mixing baffle within the housing wherein the mixing baffle has a main shaft with a "z" shaped cross section; and a reactant within the cartridge to solidify grease and oil.

10. The apparatus according to claim 9, wherein the housing includes a base that has a bearing for the "z" shaped main shaft.

11. The apparatus according to claim 9, wherein the z-shaped main shaft is adapted to interlock to a driving shaft.

12. The apparatus according to claim 1, wherein the mixing baffle has openings.

13. The apparatus, according to claim 12, wherein the openings have louvers at their lower edges.

14. The apparatus according to claim 1, wherein the mixing baffle extends to two sides of the main shaft and louvers face opposite sides of the main shaft.

15. The apparatus according to claim 1, wherein the mixing baffle supports a package of the reactant.

16. The apparatus according to claim 15, wherein the package is made of a water-soluble material.

17. The apparatus according to claim 15, wherein the package includes an amount of sodium hydroxide (lye) sufficient to turn a volume of grease to be placed in the cartridge into soap.

18. The apparatus according to claim 1, wherein the housing has a water impervious inner liner.

19. A disposable grease collection cartridge comprising:

a cylindrical composite body;

a lid on the body having an internal bearing;

a base on the body having an internal bearing and an external key;

a mixing baffle with a "z" shaped main shaft journaled in the bearings with openings on both sides of the shaft; and a water soluble package attached to the baffle containing a reactant to turn grease into soap.

20. A disposable grease collection cartridge comprising
a cylindrical composite body having an outer wall of spiral wound paper tubing and a water impervious inner liner,
a plastic base on the body having an internal bearing,
a plastic lid on the body including an inlet forming an internal bearing,
an agitator within the body including a "z-shaped" shaft engaging the bearings on the base and lid, louvered openings, and a water soluble package containing an amount of sodium hydroxide (lye) sufficient to turn a volume of grease to be placed in the body into soap.

21. The apparatus according to claim 1, further comprising a cartridge holder assembly.

22. The apparatus according to claim 21, wherein the cartridge holder assembly is constructed of rotomolded plastic.

23. The apparatus according to claim 21, wherein the cartridge holder assembly is hollow.

24. The apparatus according to claim 23, wherein the hollow cartridge assembly serves as a grease storage tank.

25. The apparatus according to claim 21, wherein the cartridge holder assembly includes an inlet valve.

26. The apparatus according to claim 21, wherein the cartridge holder assembly includes a motor and a switch.

27. The apparatus according to claim 26, wherein the switch is a plunger type switch that closes an electrical circuit when the plunger is depressed and prevents operation of the motor when a collection cartridge is not in place.

28. The apparatus according to claim 21 further comprising an oil/grease separator unit.

29. The apparatus according to claim 28, wherein the oil/grease separator unit is connected to the cartridge holder assembly by an inlet to deliver separated oil/grease to the cartridge holder assembly.

30. The apparatus according to claim 21, wherein the cartridge holder assembly includes a cartridge locating notch to prevent rotation of the grease collection cartridge within the assembly.

31. The apparatus according to claim 26, further comprising a pump driven by the motor.

32. The apparatus according to claim 31, wherein the pump delivers water and grease from the cartridge holder assembly into the cartridge housing.

33. The apparatus according to claim 26, wherein the motor rotates the mixing baffle in the cartridge housing.

34. The apparatus according to claim 33, wherein the motor rotation of the mixing baffle within the cartridge housing mixes grease, water and reactant.

35. The apparatus according to claim 21, wherein the cartridge holder assembly has a water inlet to allow water into the cartridge holder assembly.

36. The apparatus according to claim 35, wherein the water inlet has a solenoid valve.

37. The apparatus according to claim 36, wherein the solenoid valve controls the flow of water through the inlet into the cartridge holder assembly.

38. The apparatus according to claim 21, wherein the cartridge holder assembly has a heater.

39. The apparatus according to claim 38, wherein the heater provides sufficient heat to keep the grease in liquid form.

40. The apparatus according to claim 39, wherein the heater is an immersion type heater.

41. The apparatus according to claim 39, wherein the heater is an external heater.

42. The apparatus according to claim 21, wherein the cartridge holder assembly includes liquid level sensors.

43. The apparatus according to claim 42, wherein the sensors include a grease full sensor that signals when the cartridge holder assembly contains a quantity of grease appropriate to be transferred into the cartridge housing.

44. The apparatus according to claim 42, wherein the sensors include a water full sensor that signals when the cartridge holder assembly contains a desired quantity of water.

45. The apparatus according to claim 21, wherein the cartridge holder assembly further comprises a control system.

46. The apparatus according to claim 45, wherein the control system receives signals from sensors and activates a pump and motor.

47. The apparatus according to claim 21, wherein the cartridge holder assembly further includes an oil/grease inlet.

* * * * *